United States Patent
Dutta et al.

(10) Patent No.: US 8,134,360 B2
(45) Date of Patent: Mar. 13, 2012

(54) MEASUREMENT OF PIPE WALL THICKNESS USING MAGNETIC FLUX LEAKAGE SIGNALS

(75) Inventors: Sushant Madhukul Dutta, Houston, TX (US); Fathi Hassan Ghorbel, Pearland, TX (US)

(73) Assignee: William Marsh Rice University, Houston, TX (US)

( * ) Notice: Subject to any disclaimer, the term of this patent is extended or adjusted under 35 U.S.C. 154(b) by 267 days.

(21) Appl. No.: 12/411,180

(22) Filed: Mar. 25, 2009

(65) Prior Publication Data

US 2009/0243604 A1 Oct. 1, 2009

Related U.S. Application Data

(60) Provisional application No. 61/039,502, filed on Mar. 26, 2008.

(51) Int. Cl.
*G01N 27/72* (2006.01)
(52) U.S. Cl. .................................. 324/220; 324/224
(58) Field of Classification Search .................. 324/229, 324/225, 262, 239, 228, 230, 231
See application file for complete search history.

(56) References Cited

U.S. PATENT DOCUMENTS

| | | | |
|---|---|---|---|
| 4,555,665 A | | 11/1985 | Stanley et al. |
| 4,843,317 A | * | 6/1989 | Dew .............................. 324/221 |
| 5,461,313 A | * | 10/1995 | Bohon et al. ................... 324/240 |
| 6,768,299 B2 | * | 7/2004 | Almaguer ...................... 324/221 |
| 7,403,000 B2 | * | 7/2008 | Barolak et al. ................. 324/221 |
| 2007/0222438 A1 | * | 9/2007 | Reeves ........................... 324/240 |

OTHER PUBLICATIONS

Ivanov, P.A.; Zhang, V.; Yeoh, C.H.; Udpa, H.; Sun, Y.; Udpa, S.S.; Lord, W.; , "Magnetic flux leakage modeling for mechanical damage in transmission pipelines," Magnetics, IEEE Transactions on , vol. 34, No. 5, pp. 3020-3023, Sep. 1998.*
Averitt, W. D., "Magnetic wall," The International Pipe Inspectors (IPIA) edition of Crosstalk, Spring 2004, 3 pages, New Tech Systems.
Dutta, Sushant M., et al., "A method for measurement of pipe wall thickness using magnetic flux leakage signals," Mar. 25, 2008, pp. 1-16, Rice University.
Provisional patent application entitled "Method for measurement of pipe wall thickness using magnetic flux leakage signals," by Sushant Madhukul Dutta, et al., filed Mar. 26, 2008 as U.S. Appl. No. 61/039,502.

(Continued)

*Primary Examiner* — Huy Q Phan
*Assistant Examiner* — Alesa Allgood
(74) *Attorney, Agent, or Firm* — Conley Rose, P.C.; Rodney B. Carroll

(57) ABSTRACT

An apparatus comprising a processor configured to implement a method comprising obtaining a pipe profile comprising a diameter, a nominal thickness, and a material, receiving a magnetic flux leakage (MFL) indication for a pipe associated with the pipe profile, and determining a wall thickness for the pipe using the pipe profile and the MFL indication. Also disclosed is a method comprising modeling an apparatus comprising a magnet configured to induce a magnetic field in a pipe, and determining a wall thickness measurement (WTM) for the pipe using a model of the apparatus and the pipe, a detected MFL signal, and a simulated MFL signal.

20 Claims, 10 Drawing Sheets

OTHER PUBLICATIONS

Standen, Robert, et al., "A novel coiled-tubing wall thickness and ovality measuring tool for field use," SPE 107125, 2007, pp. 1-6, Society of Petroleum Engineers.

Stanley, Roderic K, "Observations on magnetic wall measurements of coiled oilfield tubing," 2009, 5 pages, American Society for Nondestructive Testing, Inc.

Stanley, R. K., "Wall thickness measurements of tubulars by nondestructive methods," undated by admitted to be prior art, 6 pages, NDE Information Consultants.

Walters, William, et al., "Using magnetic flux density to identify anomalies in pipe wall thickness," undated by admitted to be prior art, 21 pages, Scan Systems Corporation.

* cited by examiner

MEASUREMENT OF PIPE WALL THICKNESS USING MAGNETIC FLUX LEAKAGE SIGNALS

CROSS-REFERENCE TO RELATED APPLICATIONS

The present application claims priority to U.S. Provisional Patent Application 61/039,502 filed Mar. 26, 2008 by Sushant Madhukul Dutta, et al. and entitled "Method for Measurement of Pipe Wall Thickness Using Magnetic Flux Leakage Signals," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In industrial applications where pipes are installed and used to transport fluids including gases, the pipes are often monitored for defects to maintain process reliability and avoid accidents or failures. For example, the pipe wall thickness can be monitored to detect pipe defects and/or anticipate pipe failures. One technique to monitor the pipe wall thickness is based on magnetic flux leakage (MFL) at the walls. A MFL tool or device can be used for wall thickness measurement (WTM). The MFL tool uses a plurality of electric coils or permanent magnets placed on the pipe walls or in proximity of the walls to generate a magnetic field or flux along a portion of the pipe. The electric coils or permanent magnets may be oriented in a specific direction with respect to the pipe to generate the magnetic field in a desired direction, such as in the axial direction to the pipe. As the pipe wall thickness decreases, a change in the magnetic flux signal can be detected using a sensor in proximity of the pipe. The change in the magnetic flux indicates a possible defect in the pipe.

To monitor the wall thickness around the pipe circumference, a plurality of similar WTM devices can be used. For example, a plurality of sensors mounted on a ring can be used as part of an electromagnetic pipe wall monitoring system to measure changes in the average wall thickness along a portion of the pipe and around its circumference. However, before testing pipes with unknown wall thicknesses, such systems need to generate empirical reference curves for each combination of pipe size, material, and wall thickness. These empirical reference curves represent the detected MFL signal versus the actual wall thickness of the pipe, and are obtained in a laboratory by operating a MFL WTM device on a plurality of pipe samples. A separate empirical reference curve is needed for each combination of pipe material, size, and thickness. A pipe wall thickness generally cannot be obtained without an empirical reference curve for a particular combination of these parameters. To determine an unknown pipe thickness, the pipe's magnetic flux density readings are measured, compared to the empirical reference curves, and the pipe thickness is obtained from the empirical reference curves. Such a procedure is cumbersome, time consuming, and costly.

SUMMARY

In one embodiment, the disclosure includes an apparatus comprising a processor configured to implement a method comprising obtaining a pipe profile comprising a diameter, a nominal thickness, and a material, receiving a MFL indication for a pipe associated with the pipe profile, and determining a wall thickness for the pipe using the pipe profile and the MFL indication.

In another embodiment, the disclosure includes a method comprising modeling an apparatus comprising a magnet configured to induce a magnetic field in a pipe, and determining a WTM for the pipe using a model of the apparatus and the pipe, a detected MFL signal, and a simulated MFL signal.

In yet another embodiment, the disclosure includes an apparatus comprising a magnet, a core coupled to the magnet, a sensor system coupled to the magnet, the core, or both, and configured to detect a MFL signal from a pipe, and a processor coupled to the sensor system and configured to calculate a WTM for the pipe using the MFL signal and a mathematical model of the magnet and the core.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method for improved WTM based on MFL, which may be used with various types of apparatuses, without using the empirical reference curves described above. Instead, a mathematical model of the pipe wall is created and used to generate a set of simulated reference data, which may be calibrated using actual measurements from a reference sample. The set of simulated data may be generated using a plurality of values, such as the pipe material, size, and thickness. The calibrated and simulated reference data may be used with the magnetic flux detected by a sensor of the apparatus to determine the pipe wall thickness. A display, output port, or other interface may then communicate the pipe wall thickness to a user. The model is general to any combination of pipe material, size, and thickness, and thus does not require the use of empirical reference curves.

Figure 1:
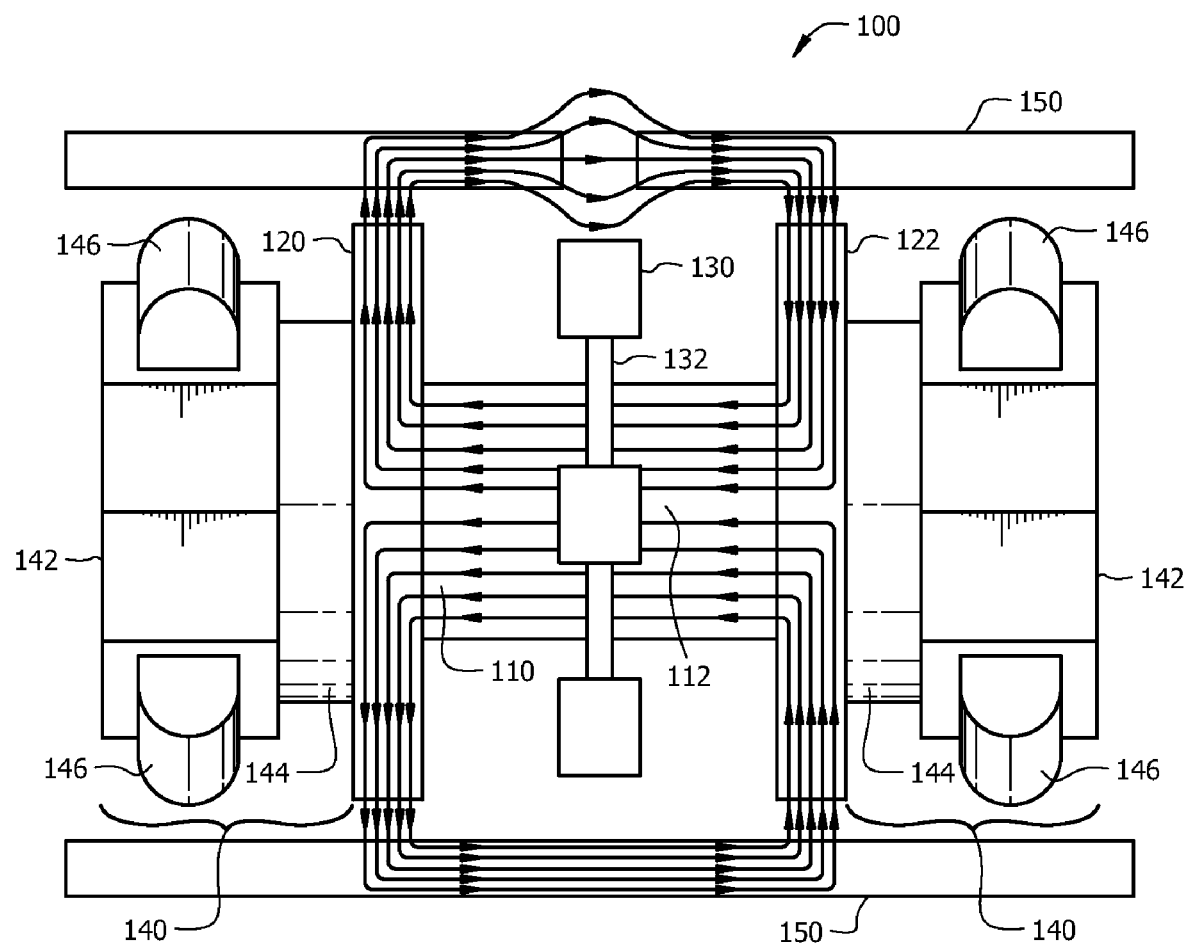
FIG. 1 is an elevation view of an embodiment of a magnetization and sensor tool.

FIG. 1 illustrates one embodiment of an internal magnetization and sensor tool 100, which may detect the MFL signals and obtain WTMs. The internal magnetization and sensor tool 100 may generate a magnetic field, such as an axial magnetic field, in a region inside and around a pipe and detect the MFL signals in proximity of the pipe's internal wall. The internal magnetization and sensor tool 100 may comprise a ferromagnetic core 110, a plurality of magnets 120 and 122, and at least one sensor 130. Additionally, the internal magnetization and sensor tool 100 may comprise at least one stabilizer 140. The internal magnetization and sensor tool 100 may be positioned and operated inside the pipe. As such, the components of the internal magnetization and sensor tool 100 may be coupled to or in close proximity to an internal wall of a pipe 150. In some embodiments, the pipe 150 may be a flat surface, in which case the internal magnetization and sensor tool 100 may be reconfigured accordingly.

The ferromagnetic core 110 may be any magnetically conductive body. For example, the ferromagnetic core 110 may be a cylinder that has a diameter smaller than the diameter of the magnets 120 and 122. The ferromagnetic core 110 may comprise a cylindrical bore 112 along its longitudinal axis, and may be magnetically coupled to the magnets 120 and 122. As such, the ferromagnetic core 110, magnets 120 and 122, and the pipe 150, may provide a magnetic circuit where a magnetic field or flux may circulate through a portion of the pipe 150, the two magnets 120 and 122, and the ferromagnetic core 110.

The magnets 120 and 122 may be any permanently or temporarily magnetized bodies. For example, the magnets 120 and 122 may be cylindrical disks that are substantially aligned with and coupled to the ferromagnetic core 110. Alternatively, the magnets 120 and 122 may be one or more cylindrical segments magnetically coupled to the ferromagnetic core 110 and perhaps each other. The magnets 120 and 122 may be spaced some longitudinal distance from one another, for instance at the opposite edges of the ferromagnetic core 120. The magnets 120 and 122 may have about the same diameter, which may be smaller than the diameter of the internal wall of the pipe 150. As such, there may be a gap between the outer edges of the magnets 120 and 122 and the internal wall of the pipe 150. The gap may be sized such that it prevents physical contact between the magnets 120 and 122 and the internal wall of the pipe 150, but allows the magnets 120 and 122 to create a magnetic field in the pipe 150.

The magnets 120 and 122 may be magnetized in the radial direction and induce a magnetic field within the pipe 150. In an embodiment, the magnet 120 may be a north pole in that the magnetic field is oriented radially outward, e.g. from the center of the magnet to its edge, while the magnet 122 may be a south pole in that the magnetic field is oriented radially inward, e.g. from the edge of the magnet to its center. As such, a magnetic field or flux may be provided, which may also be referred to as a magnetizing field. Accordingly, a plurality of magnetic flux density vectors or flux lines may originate in the radial outward direction from the magnet 120, travel through the pipe 150 and the surrounding space in proximity of the pipe 150, and converge in the radial inward direction to the magnet 122. Additionally, the flux lines may travel from the magnet 122 to the magnet 120 through the ferromagnetic core 110, which may complete the magnetic circuit. In an alternative embodiment, the internal magnetization and sensor tool 100 may comprise a coil-based device, where an electric current may be provided through the coil to generate the magnetizing field.

The sensor 130 may be any device or component capable of detecting a magnetic field or magnetic flux. The sensor 130 may be positioned around the ferromagnetic core 110 inside the pipe 150. The sensor 130 may be aligned at about the center of the ferromagnetic core 110, for instance at a midpoint between the magnets 120 and 122. In an embodiment, the sensor 130 may be coupled to a support 132 positioned on or around the ferromagnetic core 110. Like the magnets 120 and 122, the sensor 130 may be coupled to or located at a relatively small distance from the surface of the pipe 150. As such, the sensor 130 may detect the MFL signal in proximity of the pipe 150. For example, the sensor 130 may be a Hall-effect sensor that converts the magnetic field into a current proportional to the magnetic field. The current may be measured to determine the magnetic field strength. In some embodiments, the internal magnetization and sensor tool 100 may comprise a plurality of sensors 130, which may be spaced at about equal angular distances from each other around the ferromagnetic core 110. For instance, the internal magnetization and sensor tool 100 may comprise about nine sensors 130, which may be positioned at about 40 degrees from each other on the support 132. Accordingly, each sensor 130 may detect an average MFL signal for a radial portion of the pipe 150 about 40 degrees wide. Alternatively, the sensor 130 may be arranged such that each sensor 130 measures a defined portion of the pipe 150. For example, 11 sensors configured to measure a 3.5 inch diameter pipe will each measure a pipe radial section of about one inch wide.

The sensor 130 may detect the MFL signal corresponding to the flux lines through the pipe's wall, for instance at a region of the pipe's wall that may be in proximity of the sensor 130. When traveling through the pipe's wall, the flux lines may be substantially confined within and around the pipe 150, and hence the sensor 130 may detect a limited MFL signal. However, as the wall thickness decreases, for instance due to some defect, the flux lines may increasingly leak away from the pipe 150, and hence the detected MFL signal may change. This effect of the pipe wall thinning on the detected MFL signal may be used to obtain a plurality of WTMs along the pipe 150 and estimate the pipe's wall thickness profile, as described in detail below.

The stabilizer 140 may be any device that maintains stability of the internal magnetization and sensor tool 100 within the pipe 150. For example, two stabilizers 140 may be mounted at opposite sides of the magnets 120 and 122 from the ferromagnetic core 110. In an embodiment, each stabilizer 140 may comprise a body 142, a spacer 144, and a plurality of wheels 146. The spacer 144 may separate the body 142 from the magnet 120 or 122, and the body 142 may act as a support for the wheels 146. The body 142 may also comprise a drive mechanism to power the wheels 146. The wheels 146 may be located along the periphery of the body 142 at about equal angular distance from each other. The wheels 146 may be in contact with the internal wall of the pipe 150 and as such, the wheels 146 may provide a sliding mechanism for easy and stable translation of the internal magnetization and sensor tool 100 inside the pipe 150. For example, the internal magnetization and sensor tool 100 may comprise about nine wheels 146, which may be positioned at about 40 degrees from each other on each of the bodies 142. The wheels 146 may correspond or be staggered with respect to the magnets 120 and 122 and/or the sensor 130. In another embodiment, the wheels 146 may be replaced with one or more sliders, such as TEFLON-coated pads. Alternatively, one or more of the stabilizers 140 may comprise a seal extending around the circumference of the bodies 142. In such case, the internal magnetization and sensor tool 100 may be transported through the pipe 150 when a pressurized fluid is provided on one side of the internal magnetization and sensor tool 100.

Further, the internal magnetizing and sensor tool 100 may be coupled to or comprise a processing system (not shown), which may be coupled to the sensor 130. The processing system may receive the detected MFL signals, process the MFL signals, and provide the corresponding WTMs, for example via an output terminal or port. The processing system may use a mathematical model to calculate a wall thickness value that corresponds to a detected MFL signal, as described in detail below. The processing system may use a plurality of simulated MFL signals, which may be stored to process the detected MFL signal and calculate the wall thickness. Additionally, the processing system may use a plurality of parameters related to the internal magnetization and sensor system 100 and the pipe 150, which may be provided via an input terminal or port. In an embodiment, the processing system may be like that shown in the external magnetization and sensor tool 200 described below.

Figure 2:
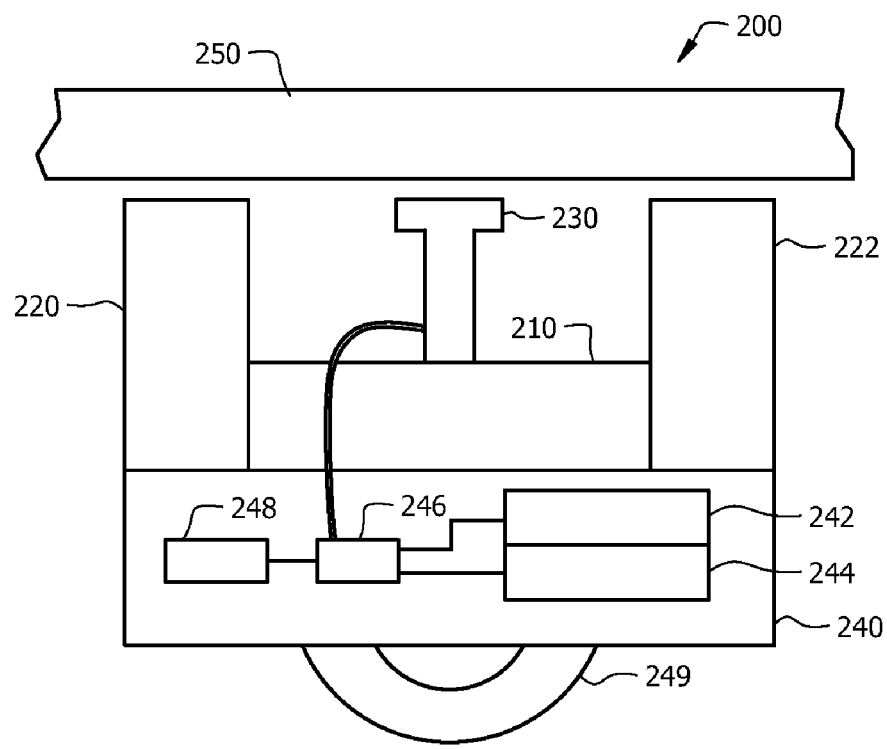
FIG. 2 is an elevation view of another embodiment of a magnetization and sensor tool.

FIG. 2 illustrates one embodiment of an external magnetization and sensor tool 200, which may detect the MFL signals outside a pipe 250 and in proximity of the outer wall of the pipe 250. The external magnetization and sensor tool 200 may generate a magnetic field, such as an axial magnetic field, in a region around and outside the pipe 250 and detect the MFL signals in proximity of the pipe's external wall. The external magnetization and sensor tool 200 may comprise a core 210, a plurality of magnets 220 and 222, and a sensor 230, which may be substantially similar to the corresponding components of the internal magnetization and sensor tool 100. The external magnetization and sensor tool 200 may also comprise a processing body 240, which may be coupled to a handle 249. Additionally, the processing body 240 may be coupled to the sensor 230 and to the core 210 and/or the magnets 220 and 222. The external magnetization and sensor tool 200 may be positioned at close proximity or in contact of the external wall of a pipe 250, for instance manually using the handle 249.

In an embodiment, the processing body 240 may comprise an input device 242, an output device 244, a processor 246, and a memory unit 248. The input device 242 may be a terminal, such as a keyboard, touch screen, input port, or the like that may be used to receive a plurality of input parameters. The input parameters may be used for processing a MFL signal detected by the sensor 230 and received by the processor 246. For instance, the input parameters may comprise the size, material, and/or wall thickness of the pipe 250 and may be stored in the memory unit 248. The processor 246 may receive a detected MFL signal from the sensor 230, process the MFL signal to obtain a corresponding WTM, and send the WTM to the output device 244. To process the MFL signal, the processor 246 may use a plurality of simulated MFL signals, which may be stored in the memory unit 248, in addition to the input parameters from the input device 242. The simulated MFL signals may be generated using a mathematical model, e.g., an analytical model based on the Maxwell electromagnetic equation. The output device 244 may be a screen, output port, printer, or the like that may be used to provide the WTMs.

In an embodiment, the external magnetization and sensor tool 200 may be a portable device, which may be coupled to a region of the pipe 250 manually. The pipe 250 may be a pipeline or a tube, which may be used to transport gas or other fluids. In some embodiments, the pipe 250 may be used for remote transportation of gas or fluids and the external magnetization and sensor tool 200 may be part of an automated robotic system, which may be translated along the length of the pipe 250 to obtain a plurality of WTMs and estimate a portion of the pipe's profile.

In an embodiment, the magnetization and sensor tool 100 or 200 may be part of an automated robotic system, which may be controlled via software and/or hardware to detect a plurality of MFL signals along the pipe. For instance, the magnetization and sensor tool 100 or 200 may be translated at a predetermined speed along a predetermined pipe length or predetermined period of time to detect the MFL signals along the length of the pipe. The MFL signals may be detected at a predetermined time or space interval to obtain a plurality of WTMs at a predetermined resolution along the pipe. The MFL signals may also be detected at a continuous time or space interval to obtain a continuous pipe wall thickness profile. For example, to reduce the required measurement time, the time or space interval may be increased, which may result in a coarse pipe wall thickness profile. Alternatively, the time or space interval may be decreased to obtain a relatively fine pipe wall thickness profile, which may result in a longer measurement time.

Figure 3:
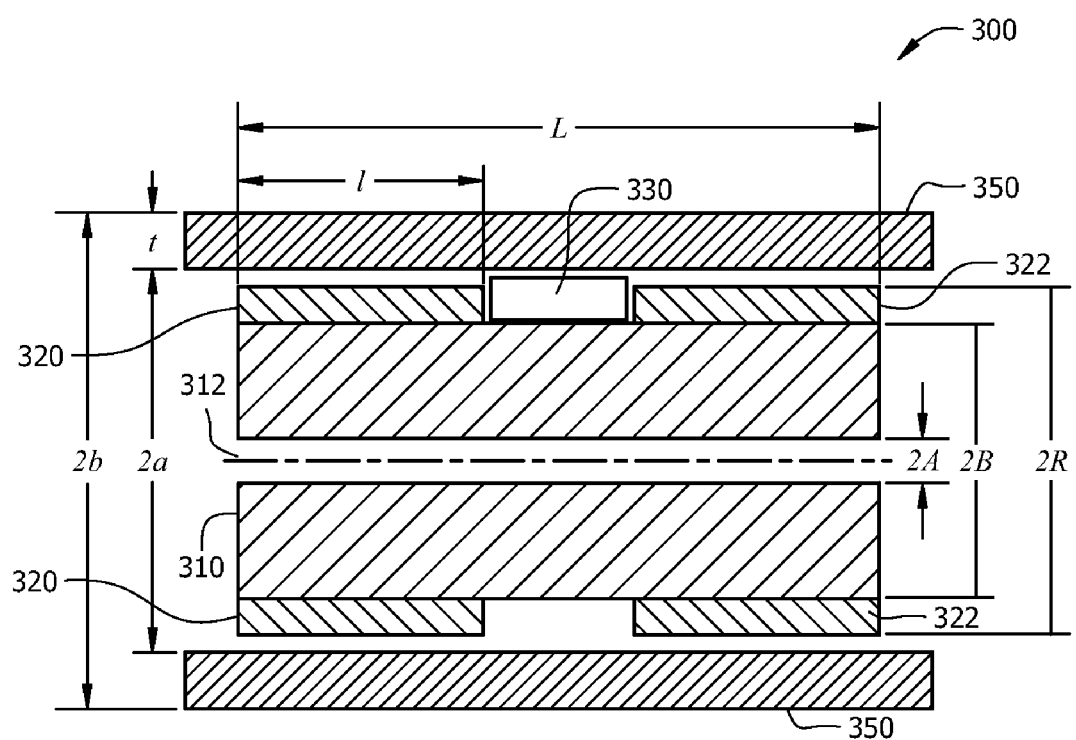
FIG. 3 is a schematic view of another embodiment of a magnetization and sensor tool.

FIG. 3 is a section view of an embodiment of the magnetization and sensor tool geometry 300, which may be used to model the magnetization and sensor tool inside a pipe 350. The magnetization and sensor tool geometry 300 may comprise a core 310, two magnets 320 and 322, and a sensor 330, which may be substantially similar to the corresponding components of the internal magnetization and sensor tool 100. The core 310, the magnets 320 and 322, and the sensor 330 may be coupled to each other and may be contained within the pipe 350. The core 310 may comprise a bore 312 through its longitudinal axis, and may be coupled to the magnets 320 and 322. The magnets 320 and 322 may have about the same dimensions and may be positioned around and at opposite edges across the core 310. The sensor 330 may be positioned between the two magnets 320 and 322 and in proximity to the surface of the internal wall of the pipe 350.

The magnetization and sensor tool geometry 300 may have a plurality of design dimensions. The design dimensions may comprise an inner radius of the core 310 (and bore 312), A, an outer radius of the core 310, B, a length of the core 310 (and bore 312), L, an outer radius of the magnets 320 and 322, R, a length of the magnets 320 and 322, l, an inner radius of the pipe 350, a, an outer radius of the pipe 350, b, and a thickness of the pipe 350, t. Further, an inner radius of the magnets 320 and 322 may be equal to the outer radius of the core 310, B, a length of the sensor 330 may be equal to about L−2l, and a thickness of the sensor 330 may be equal to about R−B.

In an embodiment, the mathematical model that describes the relation between the wall thickness and the MFL signals may be based on the Maxwell's equations. The Maxwell's equations may describe the interaction of the electromagnetic waves with materials and space. Specifically, the Maxwell's equations related to a magnetic flux density vector, B, and a magnetic field intensity vector, H, may be considered for the magnetostatic case, which may be represented as follows:

$$\nabla \times H = 0, \text{ and} \tag{1}$$

$$\nabla \cdot B = 0. \tag{2}$$

Additionally, a plurality of constitutive relations between B and H may be considered, which may be represented as follows:

$$B = \begin{cases} \mu_0 H, \text{ and} \\ \mu_0(H + M). \end{cases} \tag{3}$$

In equation 3, the first constitutive relation between B and H may be established in free space, where $\mu_0$ may be the permeability tensor of free space, e.g. $\mu_0$ may be equal to about $4\pi \times 10^{-7}$ Tesla-meter/Ampere (Tm/A). The second constitutive relation between B and H may be established in a ferromagnetic material or a permanent magnet, where M may be the magnetization vector of the ferromagnetic material or permanent magnet. Further, M may be a function of B and hence may be represented as M(B).

Additionally, a vector, A, may be introduced, where $B = \nabla \times A$, and may be substituted for the vector B in the two constitutive relations above. Hence, a set of two new equations may be obtained in the case of the free space and the ferromagnetic material/permanent magnet, respectively. The two new equations may be represented as follows:

$$\nabla \times \left(\frac{1}{\mu_0} \nabla \times A\right) = 0, \text{ and} \tag{4}$$

$$\nabla \times \left(\frac{1}{\mu_0} \nabla \times A - M(B)\right) = 0. \tag{5}$$

In an alternative embodiment, where a coil-based magnet is used instead of a permanent magnet, equation 5 may be replaced by $$\nabla \times \left(\frac{1}{\mu_0} \nabla \times A\right) = J$$

in the coil, where J is the electric current density in the coil. The mathematical model may also comprise the following boundary conditions:

$$A = 0 \text{ at } \infty, \text{ and} \tag{6}$$

A is continuous at the interfaces between the different materials. (7)

To simulate a MFL signal for a pipe, the system of equations 4 and 5 may be solved based on the boundary conditions in equations 6 and 7 to calculate the value of B, which may be about equal to or proportional to a detected MFL signal.

Further, the geometry and dimensions of the pipe and the magnetization and sensor tool, as well as the magnetic and other material properties, may be included in the formulation and solution of the equations. For instance, such properties may be added as needed to the equations or may be explicitly defined as part of the functional representation of vectors A and M.

For instance, the geometry, dimensions, and magnetic properties may be provided by the manufacturer's specifications, empirical sources, reasonable assumptions, or combinations thereof. In equation 3, the magnetic properties that may be provided may include the B vs. H plot of the ferromagnetic material and the magnetization vector of the permanent magnet, M(B). The B vs. H plot of the ferromagnetic material may comprise the B vs. H plot of the ferromagnetic core and the B vs. H plot of the pipe, which may also be a ferromagnetic material. The magnetization vector of the ferromagnetic material may be calculated using the equation:

$$M(B) = \frac{B}{\mu_0} - H(B). \tag{8}$$

Figure 4:
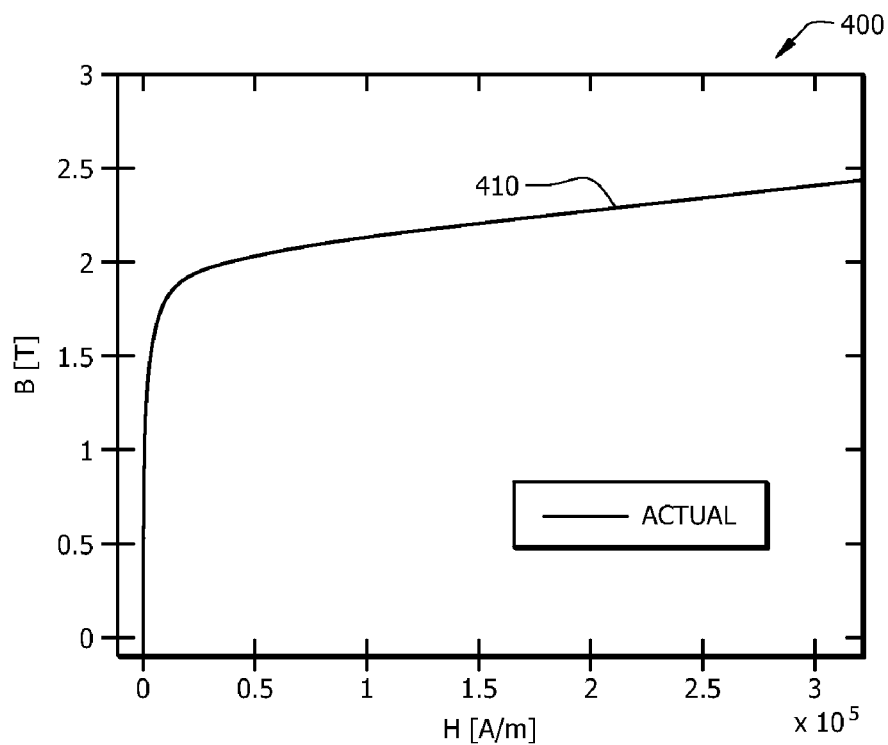
FIG. 4 is a chart of an embodiment a magnetic flux densities for a ferromagnetic core.

FIG. 4 illustrates an embodiment of a B vs. H plot 400 for a ferromagnetic core. The ferromagnetic core may be substantially homogeneous and isotropic, may be made of a 1018 low carbon alloy, and may have a temperature equal to about 20 degrees Celsius (° C.). The B vs. H plot 400 may comprise an empirical curve 410, which may be obtained experimentally using a sample pipe and a magnetization and sensor tool. The H values may range from about zero A/m to about $3 \times 10^5$ A/m and the B values may range from about zero T to about 2 T. The empirical curve 410 and equation 8 may be used to obtain the values of the magnetization vector of the ferromagnetic core, $M_c(B)$.

Figure 5:
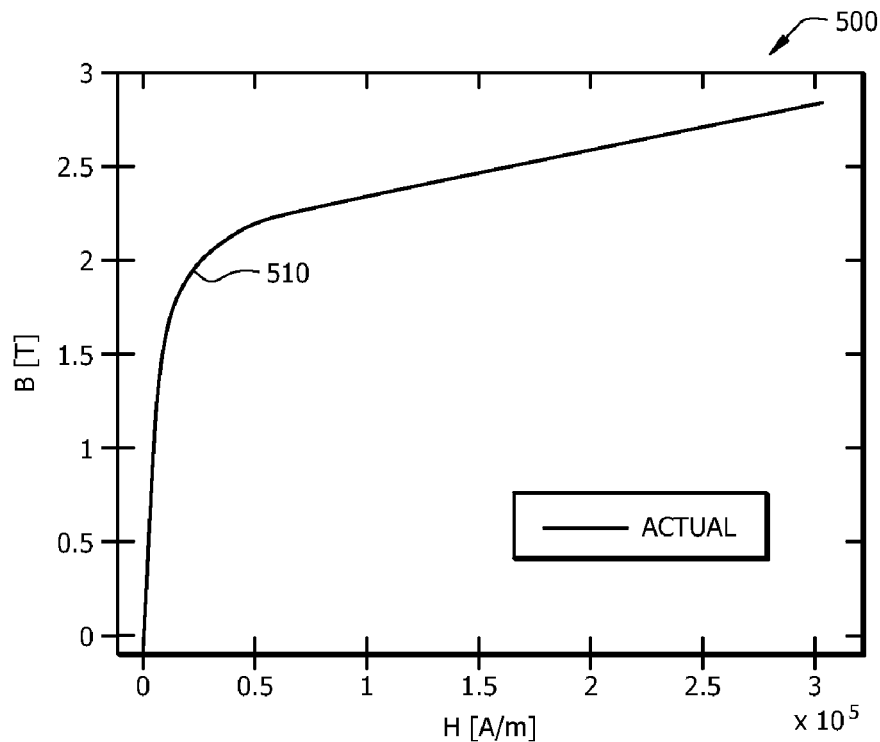
FIG. 5 is a chart of an embodiment of magnetic flux densities for a pipe.

FIG. 5 illustrates an embodiment of a B vs. H plot 500 for a pipe. The pipe may be substantially homogeneous and isotropic and may be a 90 Grade coil tubing. The H values may range from about zero A/m to about $3 \times 10^5$ A/m and the B values may range from about zero T to about 3 T. The empirical curve 510 and equation 8 may be used to obtain the values of the magnetization vector of the ferromagnetic pipe, $M_p(B)$.

Figure 6A:
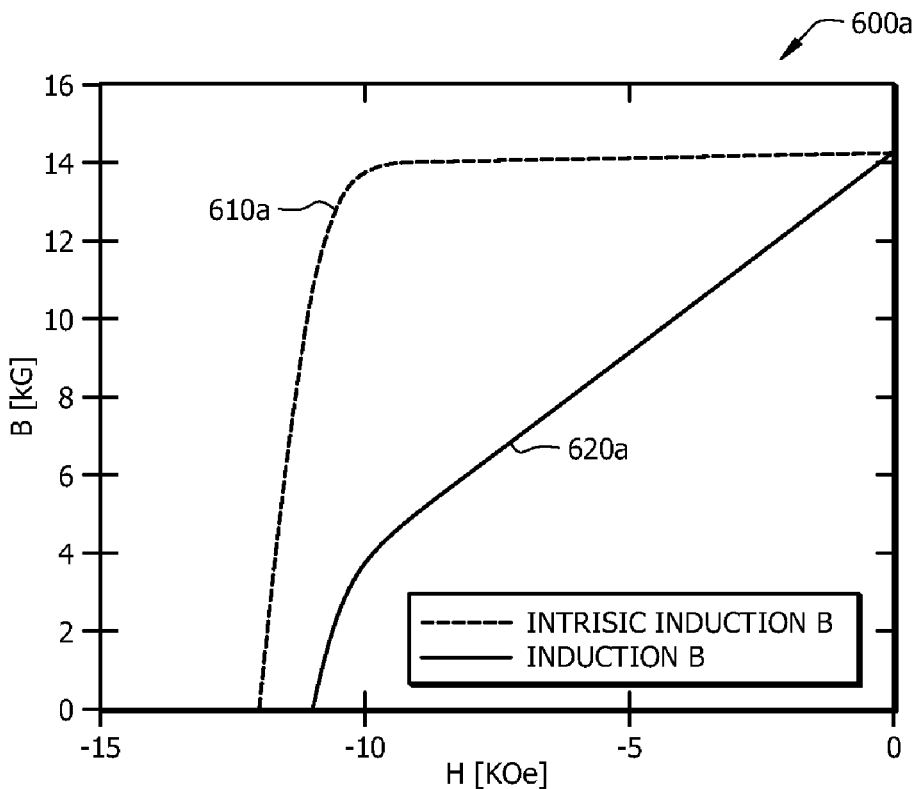
FIG. 6a is a chart of an embodiment of a demagnetization plot for a magnet.

FIG. 6a illustrates an embodiment of a demagnetization plot 600a for a magnet. The magnet may be a Magstar N50 and may have a temperature equal to about 20° C. Additionally, the magnet may be magnetized in the radial direction and may be axis-symmetric. The demagnetization plot 600a may comprise an intrinsic induction, $B_i$, curve 610a, and an induction, B, curve 620a. The induction curve 620 may comprise B vs. H values and the intrinsic induction curve 610 may comprise $B_i$ vs. H values. The values of H may range from about −15 kilo Oersted (kOe) to about zero kOe. The values of B and $B_i$ may range from about zero kilo gauss (kG) to about 14 kG. The intrinsic induction curve 610a and the induction curve 620a may both be obtained empirically. The relation between the magnetization vector, M, and the magnetic flux density vector, B, for the magnet may be obtained from the empirical induction curve 620a and equation 8.

Figure 6B:
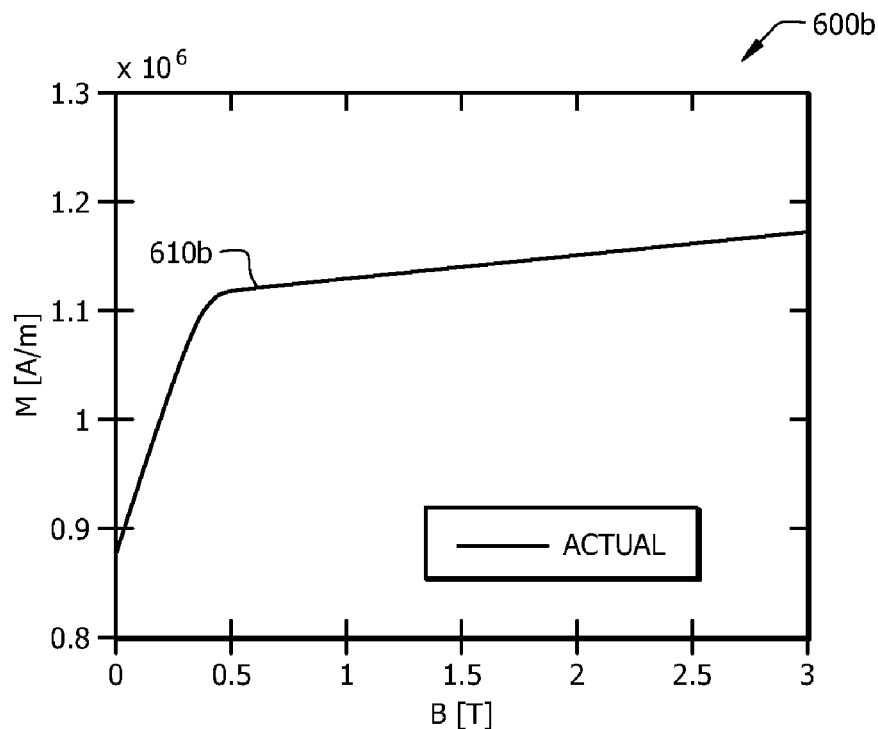
FIG. 6b is a chart of an embodiment of a magnetization plot for a magnet.

FIG. 6b illustrates an embodiment of a magnetization plot 600b for the magnet described above. The magnetization plot 600b may comprise an empirical curve 610b. The empirical curve 610b may comprise a plurality of magnetization vector, M, values vs. a plurality of magnetic flux density vector, B, values. The M values may range from about zero A/m to about $3 \times 10^5$ A/m and the B values may range from about zero T to about 3 T.

The actual magnets used to obtain the empirical curve 610b may have a sliced wedge shape instead of the cylinder geometry model. The sliced wedge shape may also expand on the inner diameter of the pipe under test. To account for such variations between the physical tool and the analytical axis-symmetric model, the magnetization of the axis-symmetric magnet model may be assumed to be less than the magnetization values shown in the empirical curve 610b, and the shown magnetization values may be obtained using a constant magnetization factor, which may be greater than about zero and less than about one.

Figure 7A:
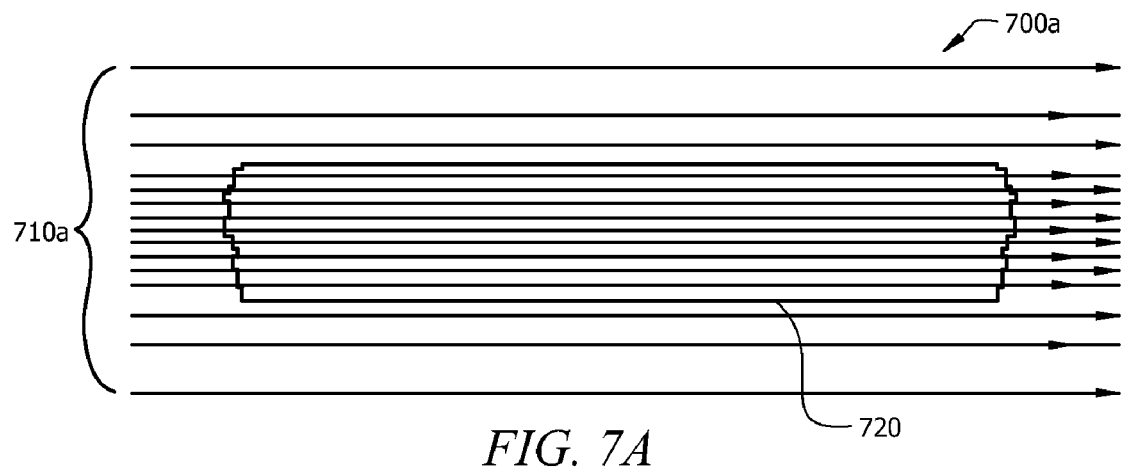
FIG. 7a is a side elevation view of an embodiment of a MFL scenario.
Figure 7B:
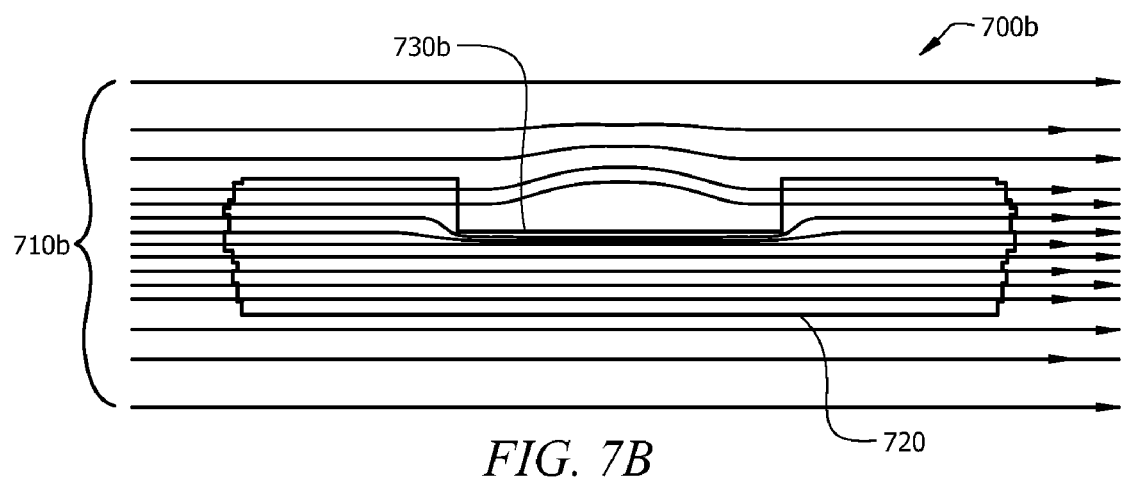
FIG. 7b is a side elevation view of another embodiment of a MFL scenario.
Figure 7C:
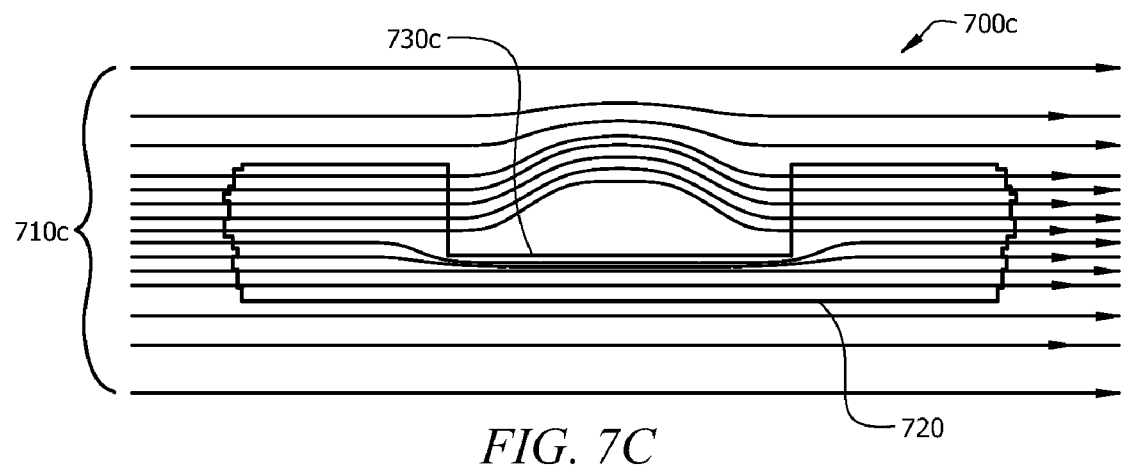
FIG. 7c is a side elevation view of another embodiment of a MFL scenario.

FIGS. 7a, 7b, and 7c illustrate embodiments of MFL scenarios 700a, 700b, and 700c, respectively, which may be generated and detected at a pipe wall. Specifically, the effect of the wall thickness on the flow of the flux lines inside and around the pipe is shown for a plurality of wall profiles with different thicknesses. In FIG. 7a, the MFL scenario 700a may comprise a plurality of flux lines 710a that travel inside and around a pipe 720. The flux lines 710a may be generated and detected using the internal magnetization and sensor tool 100, the external magnetization and sensor tool 200, or other MFL WTM devices. The flux lines 710a may correspond to an axial magnetic field generated in the direction along the pipe 720. The pipe 720 may have a uniform thickness along its length or along the region where the MFL signal may be detected.

The flux lines 710a may travel in a substantially parallel direction along the pipe 720 and may be substantially confined in proximity of the pipe 720. Specifically, the flux lines 710a may induce a plurality of magnetic poles at the wall, which may generate a demagnetizing field that opposes the magnetic field of the flux lines 710a and confine the flux lines 710a in the proximity of the pipe 720. For instance, more flux lines 710a may travel inside the pipe 720 than around the pipe 720. As such, a sensor in proximity of the pipe may detect a limited or a relatively low MFL signal that indicates a substantially confined magnetic field in the pipe. Further, since the pipe 720 may have about the same thickness along the examined region of the pipe 720, the sensor may detect about equal MFL signals along the length of pipe 720, which may estimate the uniform profile of the pipe 720.

In FIG. 7b, the MFL scenario 700b may comprise a plurality of flux lines 710b that travel inside and around another region of the pipe 720, which may comprise a wall thinning defect 730b and hence may not have a uniform profile. The wall thinning defect 730b may decrease the quantity of the induced poles, which may decrease the demagnetizing field strength that limits the leakage of the magnetic flux. Hence, at least some of the confined flux lines 710b may leak outside the pipe 720 near the wall thinning defect 730b, and at least some of the flux lines 710b may not be substantially parallel. As such, a sensor in proximity of the pipe 720 may detect a change in the MFL signal at the region of the wall thinning defect 730b, which may be compared to other MFL signals detected at the uniform regions of the pipe 720 to estimate the non-uniform profile of the pipe 720.

In FIG. 7c, the MFL scenario 700c may comprise a plurality of flux lines 710c that travel inside and yet another region of the pipe 720, which may comprise a wall thinning defect 730c. The wall thinning defect 730c of the pipe 720 may be larger than the wall thinning defect 730b, which may further decrease the quantity of induced poles and further change the leakage of the magnetic flux. Hence, more flux lines 710c may leak outside the pipe 720 near the wall thinning defect 730c, in comparison to the wall thinning defect 730b, which may cause the sensor to detect higher MFL signal levels than the MFL signals corresponding to the flux lines 710b. Such higher MFL signals may be used to estimate the profile of the pipe 720 including larger wall thinning defects.

Figure 8:
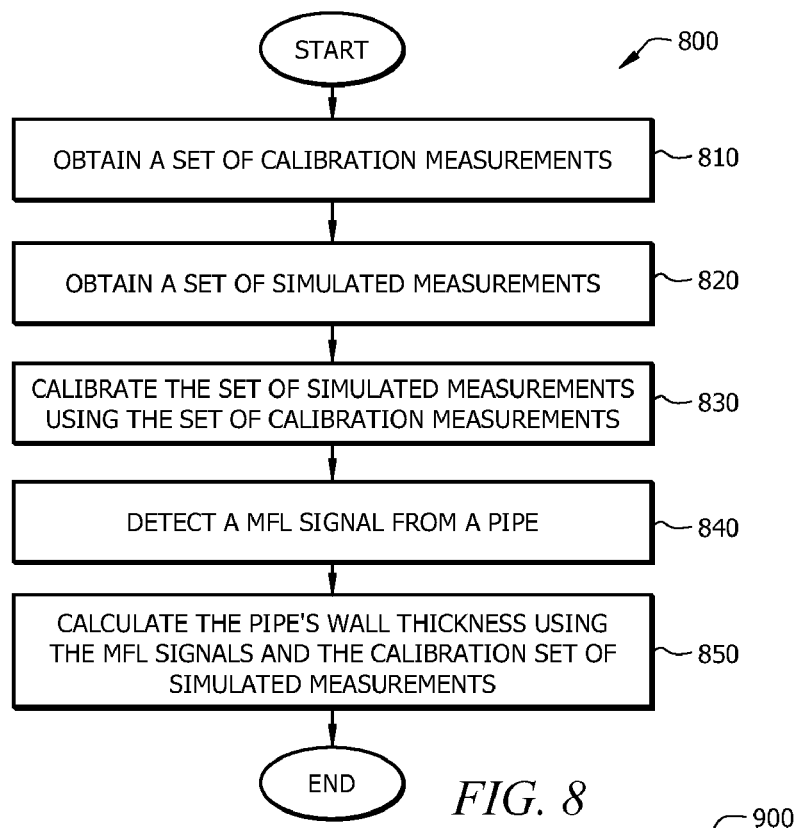
FIG. 8 is a flowchart of an embodiment of a WTM method.

FIG. 8 illustrates an embodiment of a WTM method 800, which may obtain a plurality of WTMs for a pipe using any internal or external magnetization and sensor tool to detect the MFL signals at the pipe's wall. The WTM method 800 may obtain the WTMs for a plurality of pipes with different dimensions and/or material properties after an initial set of calibration measurements. Specifically, the WTM method 800 may model the relation between the wall thickness and the MFL signals mathematically to obtain a set of simulated measurements, which may then be calibrated using the set of calibration measurements. The calibrated set of simulated measurements may be used in addition to the detected MFL signals to estimate the different pipes' profiles (or wall thicknesses) without the need for further calibration measurements for different pipes with different dimensions and/or material properties. The WTM method 800 may be advantageous in terms of time and cost since previous MFL WTM methods may require additional calibration measurements and procedures for different pipes with different dimensions and/or material properties, which may increase the processing time and/or cost. Further, the WTM method 800 may be used with a plurality of MFL WTM devices independently from the magnetization and detection schemes used, provided that each MFL WTM device is calibrated as described herein.

At block 810, the WTM method 800 may obtain a set of calibration measurements. The set of calibration measurements may be obtained using a sample pipe, the physical properties, diameter, and wall thickness of which may be known and well characterized. The set of calibrated measurements may be obtained by detecting the MFL signals from the sample pipe, for instance using the magnetization and sensor tool in a laboratory environment. The values of the detected MFL signals may be correlated with the known wall thicknesses of the sample pipe. For instance, a plot representing the MFL signals vs. the wall thicknesses may be generated and stored. The set of calibration measurements may be specific to the magnetization and sensor tool that is used to detect the MFL signals. As such, when the magnetization and sensor tool is replaced, a new set of calibration measurements may be needed. For instance, in the case of using both the external magnetization and sensor tool 200 and the internal magnetization and sensor tool 100, two corresponding sets of calibration measurements may be required.

At block 820, the WTM method 800 may obtain a set of simulated measurements. The set of simulated measurements may be obtained using a mathematical model, which may simulate the effect of the wall thickness on the axial magnetic flux inside and around the pipe. In an embodiment, the mathematical model may comprise the Maxwell's equations that describe the interaction of magnetic and electric fields with materials and geometries, as described above. The mathematical model may also comprise the geometries and material properties of the pipe and the magnetization and sensor tool used. The mathematical model may be solved using standard solution schemes to obtain a plurality of estimated MFL values corresponding to a plurality of pipe dimensions, e.g. wall thicknesses, and/or a plurality of properties, e.g. pipe permeability. The estimated MFL values and the corresponding pipe dimension and properties may represent the set of simulated measurements, which may be sorted in a library or database. For instance, a plurality of plots of estimated MFL values vs. wall thicknesses may be generated for different pipe dimensions and properties.

At block 830, the WTM method 800 may calibrate the set of simulated measurements using the set of calibration measurements. The set of simulated measurements may be obtained using about the same pipe dimensions and/or properties as the set of calibration measurements. Hence, a plot of simulated MFL signal values vs. wall thickness values may be matched with a plot of detected MFL signal values vs. wall thickness values that corresponds to a pipe with about the same dimensions (e.g., diameter and thickness) and properties (e.g., permeability). In an embodiment, to match the set of simulated measurements using the set of calibration measurements, each simulated and detected MFL value in the set that corresponds to about the same wall thickness value may be matched to one another using a tuning factor, γ. Hence, a set of tuning values, γ, vs. wall thicknesses may be obtained. The set of tuning values may then be used to calibrate the remaining sets of simulated measurements for different pipe dimensions and properties, which may eliminate the need for acquiring additional calibration measurements from experiment. After calibrating the set of simulated measurements, a plurality of MFL signals may be detected for a plurality of pipes, for instance in a field or industrial facility, to obtain the corresponding WTMs.

At block 840, the WTM method 800 may detect a MFL signal from a pipe. The WTM method 800 may also detect a plurality of signals from a plurality of pipes with different dimensions and/or properties, for instance using the same or different MFL WTM devices. At block 850, the WTM method 800 may determine the pipe's wall thickness using the detected MFL signals and the calibrated set of simulated measurements. The wall thicknesses may be estimated by matching the detected MFL signals with the stored calibrated simulated measurements and retrieving the corresponding wall thickness values. For instance, a library search routine may be implemented to match a detected MFL signal from a pipe with unknown wall thickness with a stored calibrated simulated MFL signal, which may have about the same value. Thus, the unknown wall thickness may be estimated to be equal to the stored wall thickness value corresponding to the stored calibrated simulated MFL signal.

EXAMPLES

A plurality of experiments has been concluded to further explore the concepts described herein. Accordingly, equations 4, 5, 6, 7, and 8 of the mathematical model were solved numerically for an internal magnetization and sensor tool geometry similar to that illustrated and described in conjunction with FIG. 3. The equations were solved using a finite element method package labeled as COSMOL Multiphysics. The system comprising the pipe and the magnetization and sensor tool was modeled as an axis-symmetric system. A magnetization and sensor tool with substantially the same geometry was used to detect MFL signals and obtain WTMs for a plurality of pipes. The tool is an internal automated robotic system referred to as the "itRobotics" system. Table 1 shows a plurality of values corresponding to the design dimensions for the "itRobotics" system.

TABLE 1

| Design Parameters | Values |
|---|---|
| R | 1.0855 in |
| l | 1.3750 in |
| A | 0.3205 in |
| B | 0.9605 in |
| L | 3.5000 in |
| a | 1.2815 in |
| b | 1.4375 in |
| t | 0.1560 in |

Figure 9:
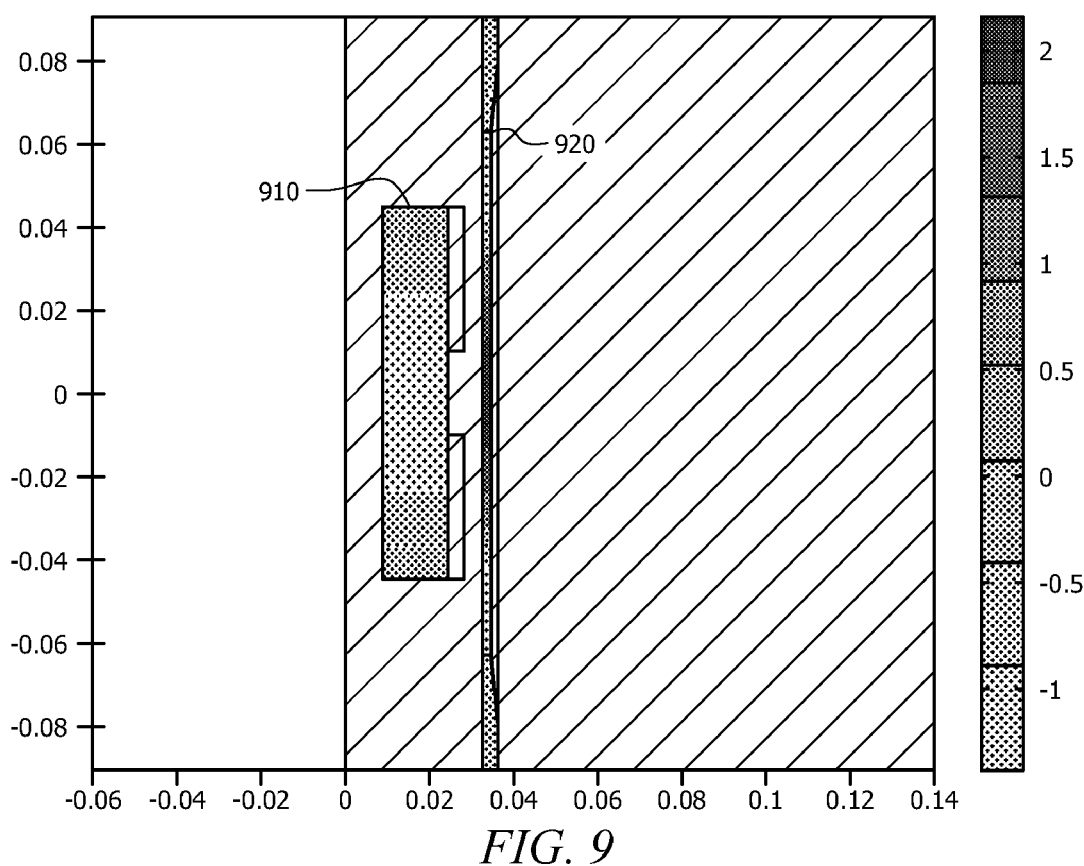
FIG. 9 is an illustration of an embodiment of an axial magnetic flux density solution.

FIG. 9 illustrates an axial magnetic flux density solution 900 that was obtained from modeling the axis-symmetric system. The axial magnetic flux density solution 900 comprises a simulated internal magnetization and sensor tool geometry 910 and a simulated pipe 920, which are both axis-symmetric. Accordingly, FIG. 9 shows one half side of the modeled system, where the other side may be substantially similar. The simulated pipe 920 may have about 50 percent wall thinning defect, which was modeled as an axis-symmetric decrease in the outer diameter of the simulated pipe 920, e.g., due to a decay in the outer wall. The simulated thinning defect has a length equal to about 177.9 mm and a taper on either side that has a length equal to about 25.4 mm. By examining the axial magnetic flux density solution 900, it was found that the magnitude of the axial magnetic flux density flows in a counter-clockwise direction. The flux density in the core region, e.g., at the core of simulated internal magnetization and sensor tool geometry 910, was found to be negative, and the flux density in the wall region of the simulated pipe 920 was found to be positive. In the free space region, the flux density was found to be equal to about $10^{-2}$ T, which is negligible. Further, the region of the simulated pipe 920 that is closest to the center of the simulated internal magnetization and sensor tool geometry 910 was found to be saturated, e.g., comprise a relatively high flux density in comparison to other regions, which may emphasize the effect of the wall thinning defect on the MFL. The sensor reading of the MFL signal may be simulated by recording the flux density at any region of the axial magnetic flux density solution 900, where the sensor may be placed.

Similar modeled solutions were obtained for a plurality of simulated pipes having wall thickness percent values that range from about 40 percent to about 100 percent with respect to the wall thickness of the simulated pipe 910. The simulated sensor reading for each solution was recorded and plotted vs. a corresponding wall thinning percent value. The wall thinning percent value is equal about 100 percent minus the wall thickness percent value. The resulting plot of values may represent the axial MFL signals vs. the wall thinning percent values, which may be referred to herein as the wall thinning reference curve.

Figure 10:
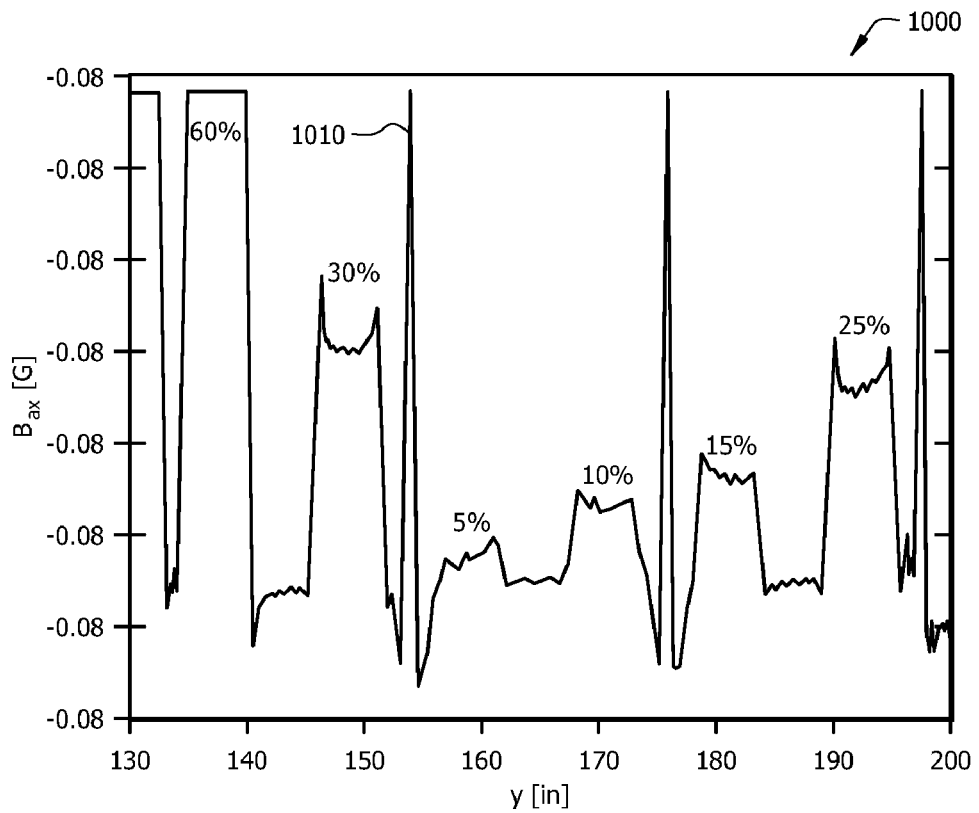
FIG. 10 is a chart of an embodiment of an axial MFL profile.

FIG. 10 illustrates an axial MFL profile 1000, which comprises a plurality of detected MFL signals 1010 along a portion of a pipe. The MFL signals 1010 were obtained experimentally for a pipe using the internal "itRobotics" system for a pipe. The pipe's average wall thickness is equal to about 0.156 in. The MFL signal 1010 values were detected along the pipe wall, and the signal values (from about 150 G to about 500 G) were plotted vs. a pipe length distance from a reference point (from about 130 in to about 200 in). The wall thinning percent values are also shown at a plurality of points along the pipe length and range from about five percent to about 60 percent. The MFL signals 1010 include sharp peaks and/or valleys at some points along the pipe length, which are measurement artifacts due to abrupt changes in the wall thickness and are ignored. Further, the Hall-effect sensor, which was used to detect the MFL signals, was found to saturate at about 490 G, which may limit the prediction of wall thinning percent values up to about 50 percent.

Figure 11:
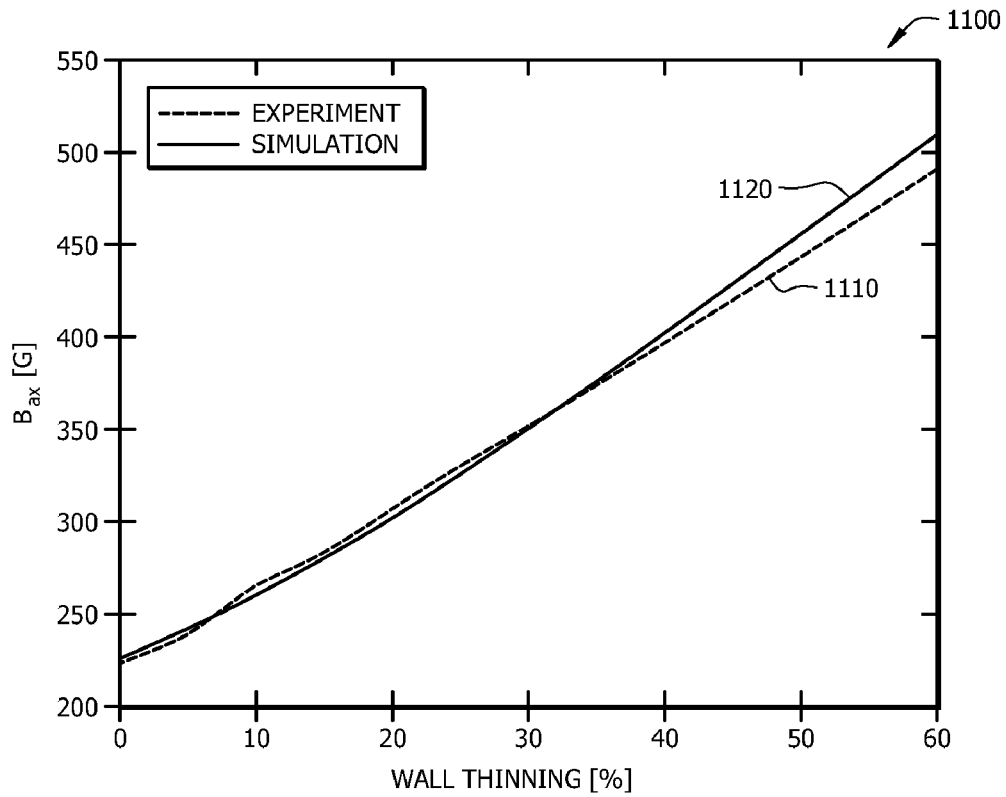
FIG. 11 is a chart of an embodiment of a wall thinning reference curve plot.

FIG. 11 illustrates a wall thinning reference curve plot 1100, which comprises an empirical wall thinning reference curve 1110 and a simulated wall thinning reference curve 1120. The empirical wall thinning reference curve 1110 was obtained from the axial MFL profile 1000 and the simulated wall thinning reference curve 1120 was modeled and matched to the empirical wall thinning reference curve 1110 using a scaling or tuning factor, γ. A good match between the empirical and simulated values is found where the wall thinning percent values range from about zero percent to about 60 percent and the MFL signal values range from about 200 G to about 550 G.

Figure 12:
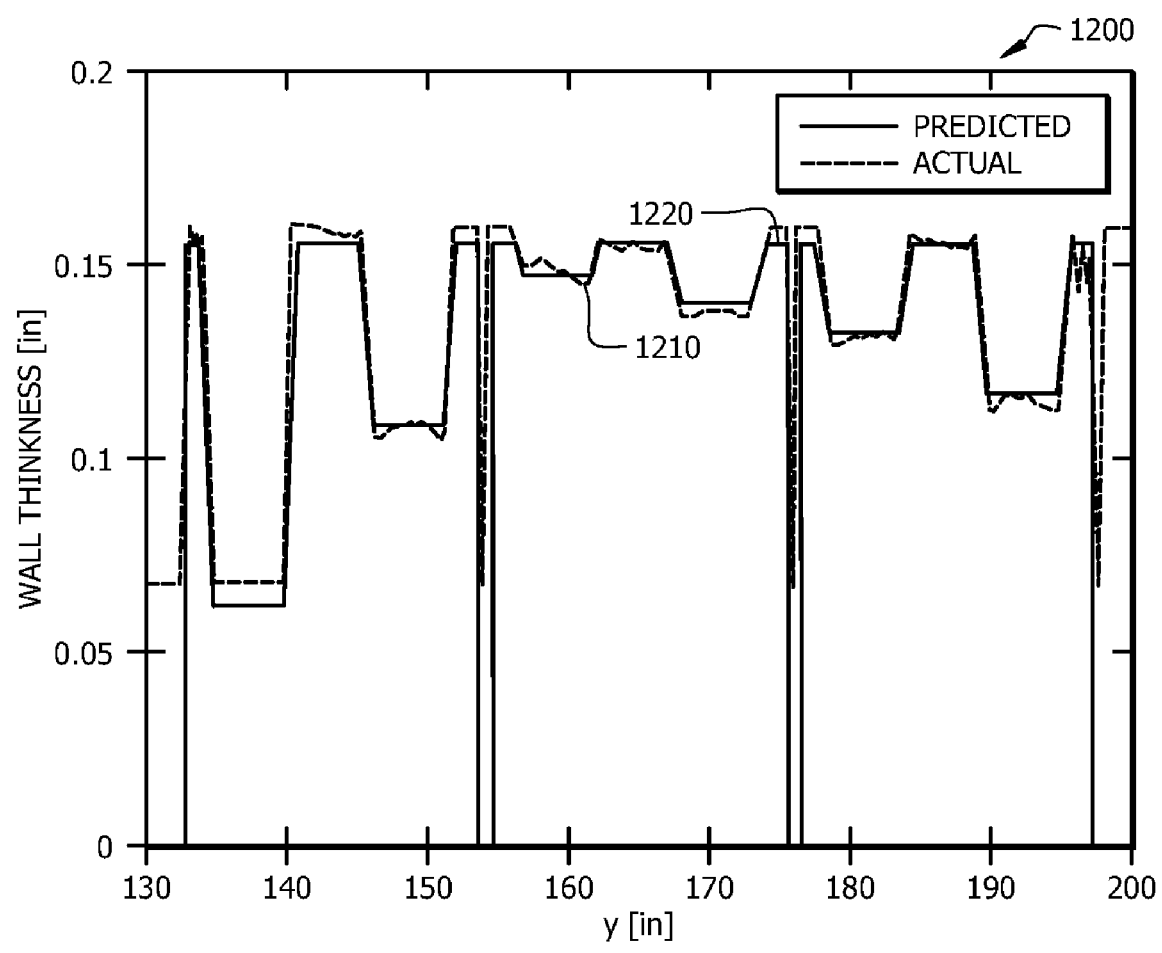
FIG. 12 is a chart of an embodiment of a wall thickness profile.

FIG. 12 illustrates a wall thickness profile 1200, which is obtained using the wall thinning reference curve plot 1100. The wall thickness profile 1200 may comprise an actual wall thickness profile curve 1210 and a predicted wall thickness profile curve 1220. The actual wall thickness curve 1210 is obtained from the empirical wall thinning reference curve 1110 and the predicted wall thickness profile curve 1220 is obtained by modeling and using the WTM method 800. The actual and predicted wall thickness values range from zero to about 0.2 in and appear to be in good agreement.

Figure 13:
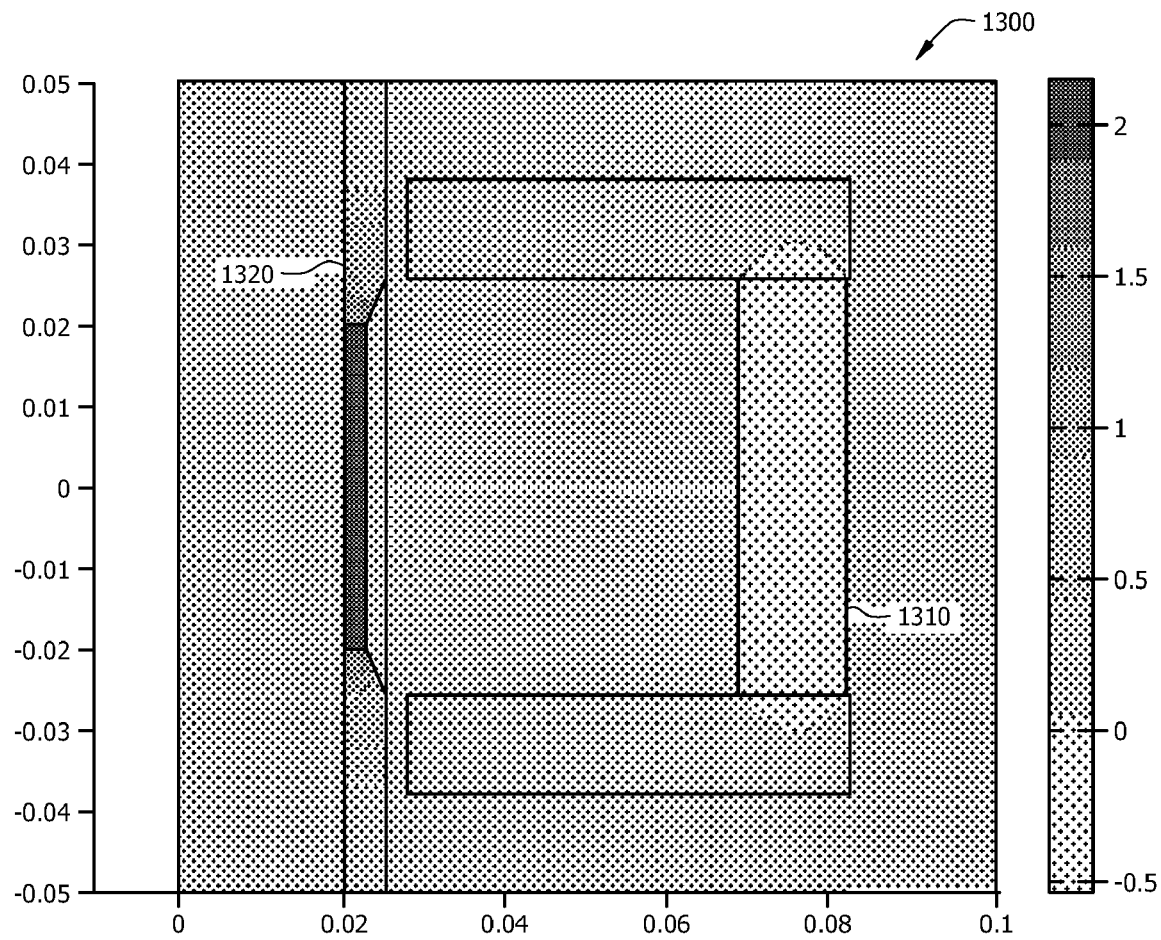
FIG. 13 is an illustration of another embodiment of an axial magnetic flux density solution.

FIG. 13 illustrates an axial magnetic flux density solution 1300, which was obtained from modeling an axis-symmetric system and a pipe and an external magnetization and sensor tool. Accordingly, the axial magnetic flux density solution 1300 comprises a simulated external magnetization and sensor tool geometry 1310 and a simulated pipe 1320, which are both axis-symmetric. FIG. 13 shows one half side of the modeled system, where the other side may be substantially similar. The simulated pipe 1320 may have about 50 percent wall thinning defect, which was modeled as an axis-symmetric decrease in the outer diameter of the simulated pipe 1320. The simulated thinning defect has a length equal to about 50.8 mm and a taper on either side that has a length equal to about 5.4 mm. By examining the axial magnetic flux density solution 1300, it was found that the magnitude of the axial magnetic flux density flows in a clockwise direction, where the flux density in the magnet region outside the pipe is negative, and the flux density inside the pipe region is positive. In the free space region, the flux density is equal to about $10^{-2}$ T. Further, the wall thinning region of the simulated pipe 1320 is found to be saturated, which may emphasize the effect of the wall thinning defect on the MFL.

Figure 14:
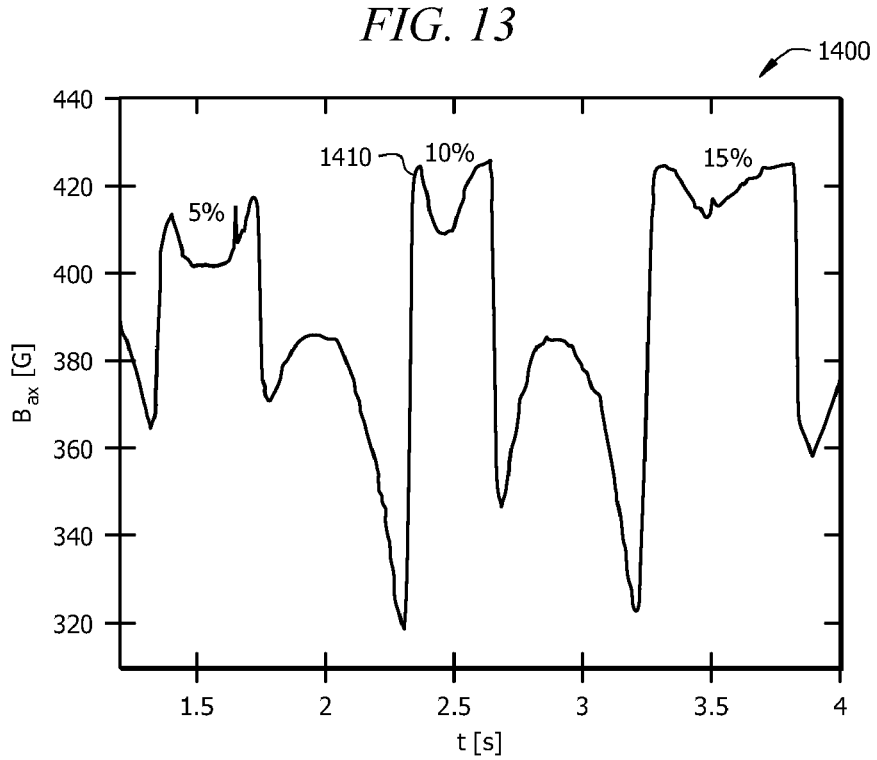
FIG. 14 is a chart of another embodiment of an axial MFL profile.

FIG. 14 illustrates an axial MFL profile 1400, which comprises a plurality of detected MFL signals 1410 along a portion of a pipe with substantially similar dimensions and properties as the modeled pipe in the axial magnetic flux density solution 1300. The pipe's average wall thickness is equal to about 0.125 in. The MFL signal values were detected at a fixed point along the pipe wall over a time duration, and the signal values (from about 320 G to about 420 G) were plotted vs. a portion of the time duration (from about on second to about 4 seconds). The wall thinning percent values are also shown at a plurality of points along the time duration and range from about five percent to about 15 percent.

Figure 15:
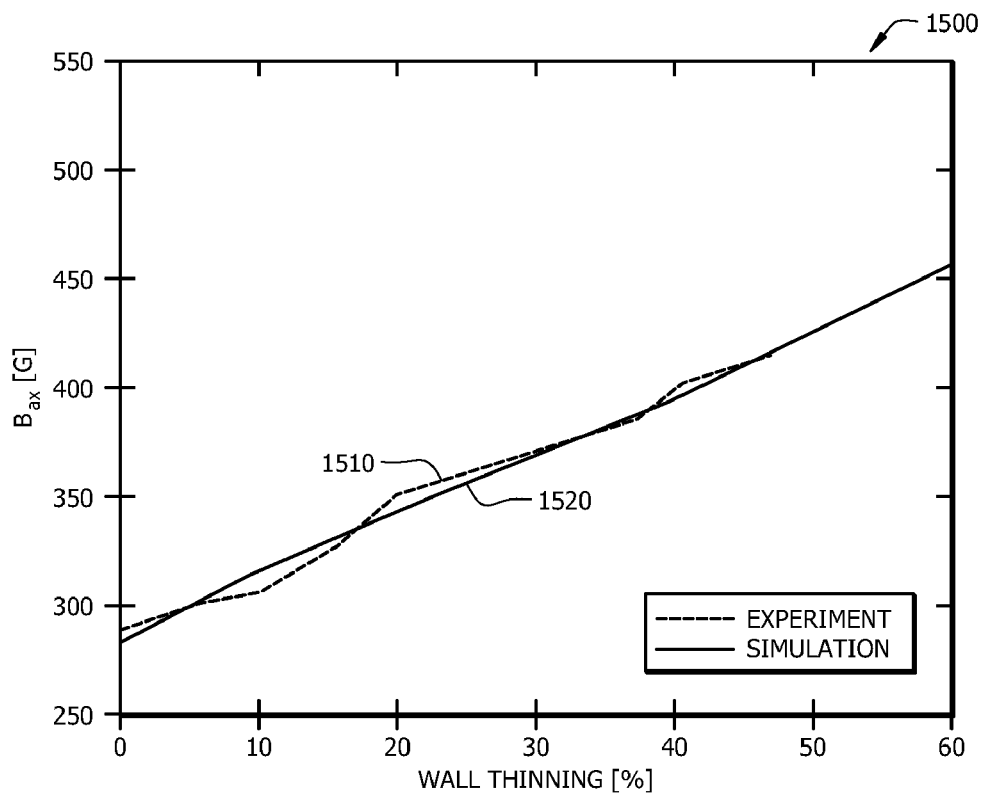
FIG. 15 is a chart of another embodiment of a wall thinning reference curve plot.

FIG. 15 illustrates a wall thinning reference curve plot 1500, which comprises an empirical wall thinning reference curve 1510 and a simulated wall thinning reference curve 1520. The empirical wall thinning reference curve 1510 was obtained from the axial MFL profile 1400 and the simulated wall thinning reference curve 1520 was modeled and matched to the empirical wall thinning reference curve 1510 using a scaling or tuning factor, γ. A good match between the empirical and simulated values is found where the wall thinning percent values range from about zero percent to about 60 percent and the MFL signal values range from about 250 G to about 500 G.

Figure 16:
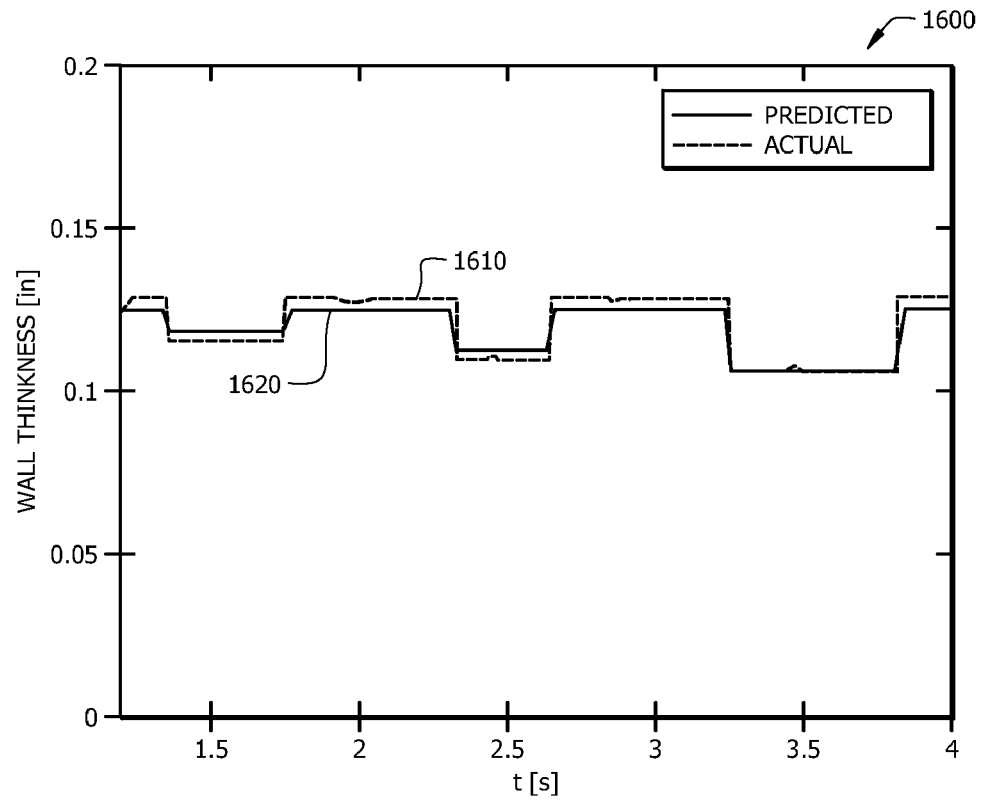
FIG. 16 is a chart of another embodiment of a wall thickness profile.

FIG. 16 illustrates a wall thickness profile 1600, which is obtained using the wall thinning reference curve plot 1500. The wall thickness profile 1600 may comprise an actual wall thickness profile curve 1610 and a predicted wall thickness profile curve 1620. The actual wall thickness curve 1610 is obtained from the empirical wall thinning reference curve 1510 and the predicted wall thickness profile curve 1620 is obtained by modeling and using the WTM method 800. The actual and predicted wall thickness values range from zero to about 0.2 in and appear to be in good agreement.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a processor configured to:
   obtain a pipe profile comprising a diameter, a nominal thickness, and a material;
   receive a magnetic flux leakage (MFL) indication for a pipe associated with the pipe profile; and
   determine a wall thickness for the pipe using the pipe profile, the MFL indication, and a simulated MFL indication that matches the MFL indication,
   wherein the simulated MFL indication is obtained from a purely mathematical model of the apparatus and a tuning factor that modifies the purely mathematical model of the apparatus.

2. The apparatus of claim 1, wherein the wall thickness is calculated without using empirical data, and wherein the MFL indication used to determine the wall thickness for the pipe consists of an axial component of the MFL indication.

3. The apparatus of claim 1, wherein calculating the wall thickness comprises solving a plurality of Maxwell's equations, and wherein the Maxwell's equations are solved using a finite element method.

4. The apparatus of claim 1, wherein the Maxwell's equations comprise a permeability tensor for a ferromagnetic core, a permeability tensor for a pipe, a permeability tensor for a magnet, and the magnet's magnetization vector, and wherein the pipe model is axis-symmetric.

5. The apparatus of claim 1, wherein the pipe comprises a wall thinning defect that ranges from about five percent to about 50 percent of the pipe's original wall thickness.

6. The apparatus of claim 1 further comprising:
   a magnet;
   a core coupled to the magnet; and
   a sensor coupled to the processor and the magnet, the core, or both.

7. The apparatus of claim 1, wherein the tuning factor is obtained by calibrating the apparatus to only one sample pipe.

8. A method comprising:
   obtaining a plurality of simulated magnetic flux leakage (MFL) signals using a model of an apparatus comprising a magnet configured to induce a magnetic field in a pipe; and
   calibrating the plurality of simulated MFL signals using a measured MFL signal for only one sample pipe that has a known wall thickness and comprises a known material,
   wherein the apparatus is configured to determine a plurality of wall thickness measurements (WTMs) for a plurality of pipes that have different wall thicknesses and different material properties using the calibrated simulated MFL signals without additional calibration, and
   wherein the apparatus is configured to determine the WTM for one of the pipes that has an unknown wall thickness using a detected MFL signal for the pipe and one of the calibrated simulated MFL signals that matches the detected MFL signal.

9. The method of claim 8, wherein the model of the apparatus and the pipe comprises a pipe diameter, a pipe nominal thickness, and a pipe material.

10. The method of claim 9, wherein the simulated reference signal is calibrated using a tuning factor that modifies a selected one of the simulated MFL signals such that the modified selected simulated MFL signal matches the measured MFL signal, and wherein the selected simulated MFL signal corresponds to the sample pipe's wall thickness and material.

11. The method of claim 8, wherein a diameter of the pipe that has an unknown wall thickness is different from a diameter of the sample pipe, wherein a permeability of the pipe that has an unknown wall thickness is different from a permeability of the sample pipe, wherein a wall thickness of the pipe that has an unknown wall thickness is different from a wall thickness of the sample pipe, and wherein a diameter of the pipe that has an unknown wall thickness is different from a diameter of the sample pipe.

12. The method of claim 8, wherein the detected MFL signal used to determine the wall thickness for the pipe that has the unknown wall thickness consists essentially of an axial component of the detected MFL signal.

13. An apparatus comprising:
    a magnet;
    a core coupled to the magnet;
    a sensor system coupled to the magnet, the core, or both, and configured to detect a magnetic flux leakage (MFL) signal from a pipe; and
    a processor coupled to the sensor system and configured to calculate a wall thickness measurement (WTM) for the pipe using the MFL signal and a mathematical model of the magnet and the core comprising a simulated MFL signal that matches to the MFL signal
    wherein the MFL signal used to calculate the wall thickness for the pipe consists essentially of an axial component of the MFL signal.

14. The apparatus of claim 13, wherein the magnet, the core, and the sensor system are part of an automated robotic system that is translated along the pipe's length.

15. The apparatus of claim 13, wherein a sensor system comprises a Hall-effect sensor, wherein the processor is also configured to use a pipe diameter, a pipe nominal thickness, and a pipe material when calculating the WTM for the pipe.

16. The apparatus of claim 13, wherein the magnet, the core, and the sensor system are positioned inside the pipe, and wherein the sensor system comprises a plurality of sensors distributed around the periphery of the core.

17. The apparatus of claim 13, wherein the magnet, the core, and the sensor system are positioned outside the pipe.

18. The apparatus of claim 13, wherein the magnet comprises a permanent magnet.

19. The apparatus of claim 13, wherein the magnet comprises a coil.

20. The apparatus of claim 13, wherein a purely mathematical MFL signal was modified using a tuning factor to obtain the simulated MFL signal, wherein only one calibration pipe was used to obtain the tuning factor, and wherein the tuning factor is used to obtain a plurality of other simulated MFL signals for other pipes having other diameters, material compositions, and nominal thicknesses.

* * * * *

UNITED STATES PATENT AND TRADEMARK OFFICE
CERTIFICATE OF CORRECTION

| | | |
|---|---|---|
| PATENT NO. | : 8,134,360 B2 | Page 1 of 1 |
| APPLICATION NO. | : 12/411180 | |
| DATED | : March 13, 2012 | |
| INVENTOR(S) | : Sushant Madhukul Dutta et al. | |

It is certified that error appears in the above-identified patent and that said Letters Patent is hereby corrected as shown below:

Column 15, line 36, claim 4, replace "claim 1" with --claim 3--.

Signed and Sealed this
Seventeenth Day of April, 2012

David J. Kappos
*Director of the United States Patent and Trademark Office*